Figure 2B:
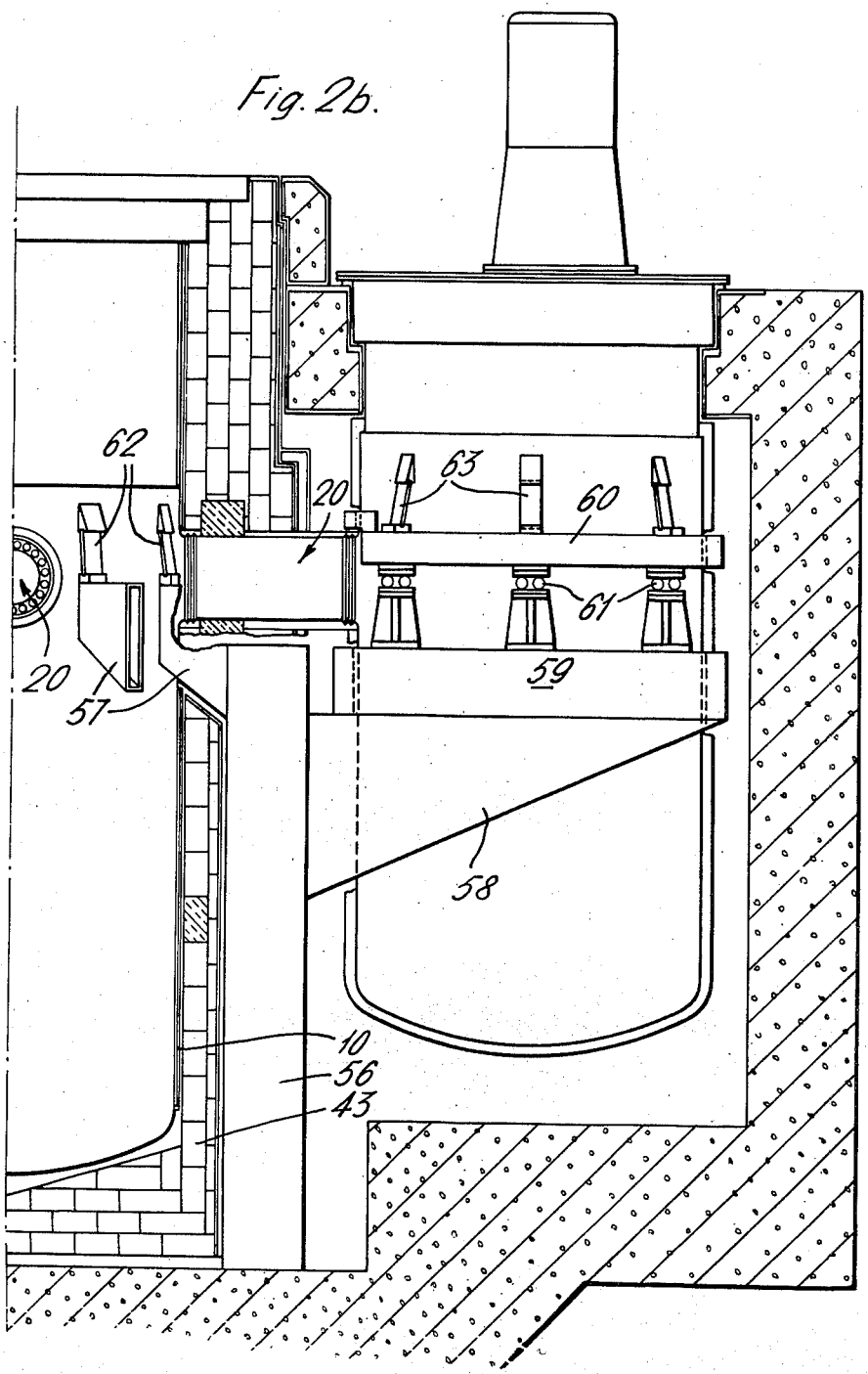

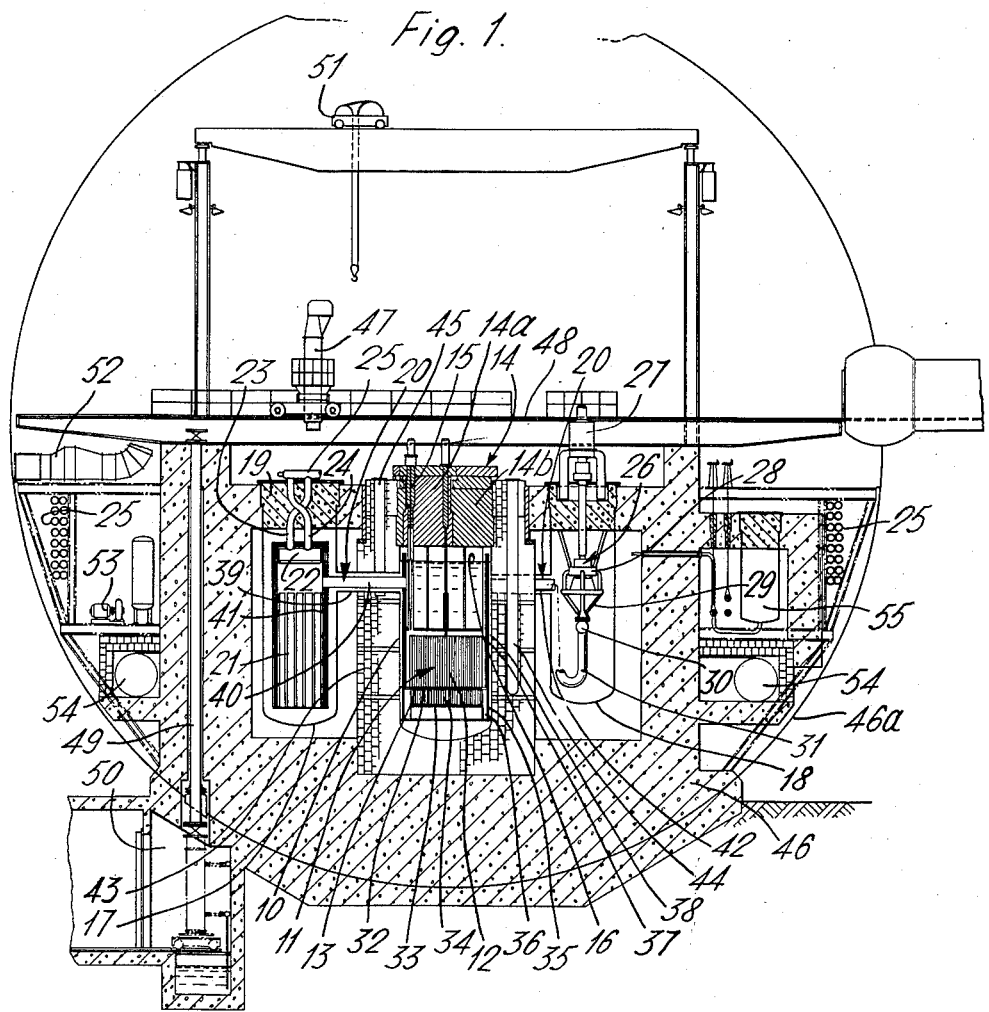

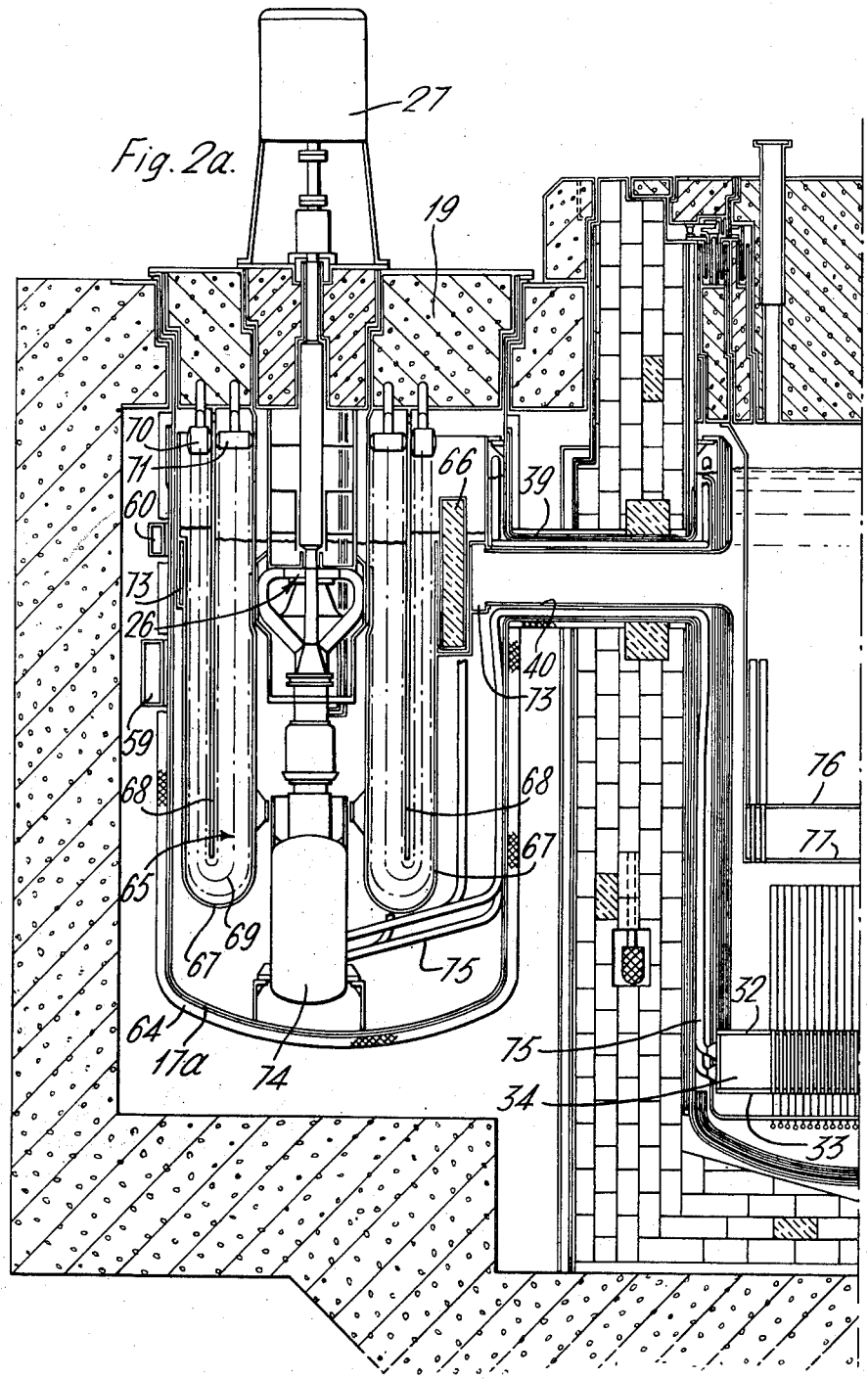

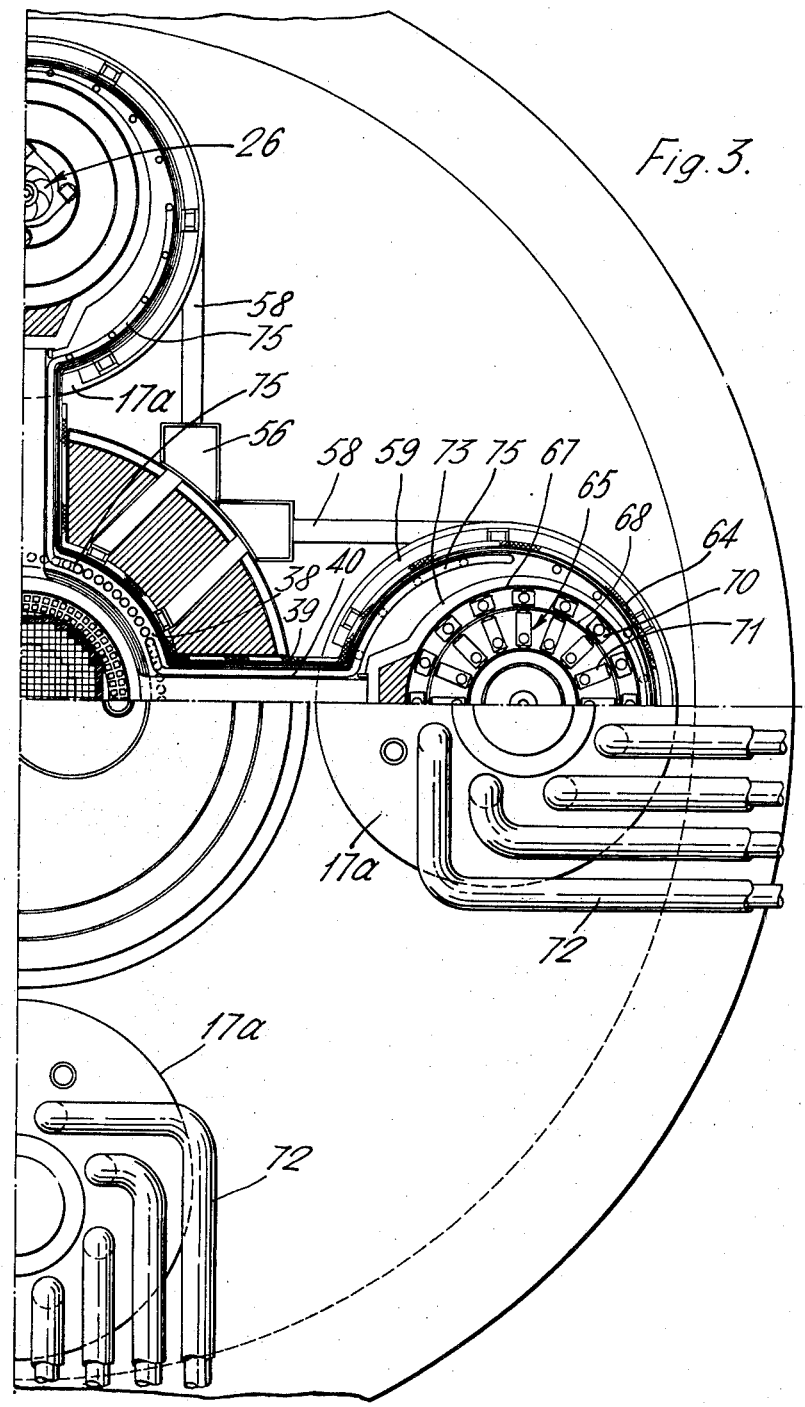

United States Patent Office 3,182,002
Patented May 4, 1965

3,182,002
LIQUID COOLED NUCLEAR REACTOR WITH IMPROVED HEAT EXCHANGE ARRANGEMENT
John Michael Laithwaite, Wilmslow, Leslie Charles Cole, Culcheth, near Warrington, and William George Hutchinson, Appleton, England, assignors to United Kingdom Atomic Energy Authority, London, England
Filed Nov. 19, 1962, Ser. No. 238,440
Claims priority, application Great Britain, Oct. 17, 1962, 39,278/62
3 Claims. (Cl. 176—65)

The present invention relates to nuclear reactors of the kind having a core through which is passed a coolant conducted to a heat exchanger. More particularly, the invention concerns such reactors wherein the coolant is a liquid and wherein a cycle for the liquid coolant is open to a coolant reservoir.

The inclusion of a coolant reservoir provides added thermal capacity to the system to reduce by mixing effects the rate of rise of temperature of the coolant in the event of a tendency towards overheating of the core. It should be realised that even when a highly rated reactor, such as a fast reactor, has been shut down there will be sufficient heat generated by the decay of radioactive fission products accumulated in the fuel to carry the risk of the fuel being melted unless the removal of such heat is continued by the coolant. Considering the possibility, for example, that the shutting down of the reactor is a consequence of failure of the coolant pumping power, it follows that the greater the bulk of coolant available the slower will be the rise of its temperature for a given rate of heat generation in the core and hence the more time there will be within which to correct the fault which has led to the pumping power failure.

It has been appreciated already that the core and several heat exchangers therefor can be immersed in the reservoir coolant and this has led to the concept for fast reactors of a tank which is large enough to hold the core and the primary heat exchangers in a pool of liquid metal coolant, for example sodium or an alloy thereof with potassium. Immersion in this manner has the advantages of ensuring that a breach of the coolant conduits does not result in loss of coolant to the core because these conduits are all within the pool and also of reducing the extent of such conduits so as to facilitate convective flow of the coolant through the core. However, for a typical size of reactor producing power commercially the tank required by this concept becomes so large that the construction alone becomes an undertaking raising formidable problems; coupled with the constructional difficulties is the probability in the case of liquid metal coolant that the material employed would have to be stainless steel or other corrosion resistant metal of equal expense. Thus, it is estimated that for a fast reactor with a design rating of 1,000 mw. (thermal) the tank would have a diameter of about 55 feet and, considering only a single wall, would weigh about 130 tons. Further difficulties arise with a tank of this magnitude in providing a second outer wall to act as a leak jacket, mainly because of the importance of maintaining a small clearance between the walls so that if leakage does occur the level of the coolant pool in the tank will not be unduly depressed. With a leak jacket added, the combined weight of the tank in the example just quoted would be about 245 tons and the weight of the coolant pool contained by it would be, in the case of sodium, about 1650 tons. A need therefore arises for some alternative to the single tank concept which will still retain the same advantages.

According to the present invention, a nuclear reactor having for a liquid core coolant a cycle which is open to a reservoir of the liquid coolant comprises separate tank vessels respectively housing the core and each of a plurality of heat exchangers, the latter being adapted to discharge core coolant direct to the respective vessel interior after heat exchange to a secondary coolant, a top closure for each tank vessel, thermally insulating means disposed within the core tank vessel to define over the full expanse of its internal surfaces a space which is separate from coolant passing through and leaving the core, an outer duct establishing communication between said space and the interior of each of the heat exchanger tank vessels such that through the outer ducts a mass of liquid coolant acting as the coolant reservoir is common to said space and the interiors of the heat exchanger tank vessels, and an inner duct penetrating the thermally insulating means and extending through each outer duct to a respective heat exchanger for conducting thereto hot liquid coolant leaving the core. The containment of the coolant reservoir constituted by the separate tank vessels and the interconnecting outer ducts is therefore not exposed to the hot coolant leaving the core and consequently the temperature of this structure is maintained substantially uniform and normally less than the temperature of the hot coolant. Furthermore, the arrangement of inner and outer ducts reduces the number of penetrations through the tank vessel walls below the liquid level, it being important to the integrity of the reservoir containment that joints and other interruptions below the liquid level are kept to a minimum.

The amount of ducting for the interconnection of the separate tank vessels is also reduced if the coolant circulating means is included with the heat exchangers in the heat exchanger tank vessels instead of being accommodated in other tank vessels. It is preferred that such means deliver coolant at the core entrance through pipework extending into the core tank vessel through the outer ducts. In this way the vessel walls and also the interconnecting outer ducts are relieved, not only of unequal thermal stressing as would result from contact with the hot coolant leaving the core, but also from pressure stressing arising from contact with the delivery of the circulating means.

Other aspects and features of the invention will emerge from the following description of a particular embodiment which is taken by way of example, this embodiment being illustrated in the accompanying drawings, in which:

FIGURE 1 shows a sectional elevation of the reactor general assembly,

FIGURES 2a and 2b show respectively to either side of the vertical centre line the reactor core and heat exchangers of a modified form of FIGURE 1, the former view being a section through the tank vessels and the core and heat exchangers housed therein, and the latter showing the exterior of these vessels, and FIGURE 3 is a plan view of FIGURES 2a and 2b, in part taken in section through the core and heat exchangers.

The illustrated embodiment is a fast reactor in which the core coolant is a liquid metal such as sodium or an alloy of sodium with potassium.

In FIGURE 1 there is centrally situated a core tank 10 in the lower half of which is supported a core 11 composed of closely packed fuel element assemblies, such as 12, which stand upright on a grid 13 together with breeder element assemblies of similar shape constituting a surrounding breeder blanket. A top closure for the core tank is constituted by an eccentric rotating shield arrangement indicated generally 14 having, in known manner, an inner shield 14a with an eccentric fuelling bore 15 fitted rotatably in an eccentric bore of a larger, outer shield 14b which is rotatable about the core tank centre line. Liquid metal coolant fills the core tank up to a level which in operation of the reactor lies just below the top closure, as indicated at 16, so as to leave over the core an ample depth of coolant for fuel element assemblies drawn clear of the core to remain immersed. Over the free surface of the liquid metal coolant is maintained an appropriately pressurised atmosphere of a cover or blanket gas, such as argon or nitrogen.

In a ring around the core tank are disposed symmetrically four heat exchanger tanks, such as 17, alternating with four smaller pump tanks 18 (this section to the right of the centre line in FIGURE 1 being at 135° to the section on the left in order that the tank 18 may be shown). The top closure of each of these tanks is in the form of a stepped plug, such as 19, which is conveniently of metal clad concrete. Interconnecting the core tank with each of the heat exchanger and pump tanks are coaxially arranged inner and outer ducts extending radially of the core tank with their axes in a common horizontal plane at a level below the liquid metal coolant level 16, such ducting being designated generally 20. Each heat exchanger 21 is of the shell and tube type which receives hot liquid metal coolant in the shell for heat exchange to a secondary coolant, usually of the same composition as the core or primary coolant, which is fed through the tubes from a divided header 22 having inlet and outlet connections 23 and 24 following a tortuous path through the tank plug 19. These connections establish respectively with parallel runs of lagged ducting 25 a secondary coolant circuit to secondary heat exchangers (not shown) in which steam is raised for driving prime movers. Each pump 26 is a centrifugal pump which is driven by a motor 27 supported over the tank plug 19 and has an impeller casing 28 with an inlet opening directly to the interior of the respective pump tank and an outlet manifold 29 delivering through a non-return valve 30 into an outlet pipe 31.

Within the core tank 10 two horizontal support plates 32 and 33 forming part of the grid 13 are spaced apart to define an inlet plenum 34, these plates being supported on a framework 35 which defines an annular chamber 36 having open communication with the inlet plenum. The space below the lower support plate 33 receives leakage from the inlet plenum past plug-shaped ends of the fuel element assemblies inserted into holes in the lower support plate and since, as will next be described, the delivery of the pumps is passed into the inlet plenum for forcing through the core, a hydrostatic pressure is set up acting downwards on the ends of the fuel element assemblies in order to prevent levitation by the upward flow through the core.

Also within the core tank, a thermal shield 37 stands on the framework 35 and by extending upwards to above the liquid metal coolant level 16 forms a barrier separating the core and coolant above it from a space 38 extending over the full expanse of the interior surfaces of the core tank. It is into this space 38 that the outer ducts 39 of the coaxial ducting 20 open. In the case of the ducting between the core tank and the heat exchanger tanks, the inner duct, indicated 40, penetrates the thermal shield 37 at one end and at the other end penetrates thermal shielding 41 surrounding the heat exchanger so that hot coolant leaving the core is passed to the heat exchanger shell without coming into contact with the walls of the tank. In the case of the ducting between the core tank and the pump tanks, the inner duct, indicated 42, is connected at one end with the pump outlet pipe 31 and at the other end, within the space 38 of the core tank, has a distributor casing (not shown) which distributes the pump delivery to a number of smaller bore pipes (also not shown) which are laid in a single-layer array within the space 38 to conduct the pump delivery to the inlet plenum 34.

The core coolant circuit is as follows: Starting from the inlet plenum, the coolant flows through the core 11 and from thence through the inner duct 40 to the shell of the primary heat exchanger 21; after heat exchange to the secondary coolant, it is discharged from the heat exchanger shell to the heat exchanger tank for intermixing with the reservoir of coolant held in common by the tanks. By the effect of the free surface head, transfer of coolant proceeds from the heat exchanger tanks through the outer ducts 39 and the space 38 to the pump tanks where the pumps 26 draw coolant from the common reservoir and deliver it through the inner ducts 42 to the inlet plenum 34.

It is to be understood that the tanks are, with the exception of the fittings necessary for the coaxial ducting 20, of integral construction without apertures, joints or other interruptions below the liquid metal coolant level, and also that, with the inclusion of a leak jacket, they have double walls, as nearly as possible with independent support, which between them provide an interspace which can be instrumented for leakage detection. This interspace should have a width of the order of one inch. For the coaxial ducting, the leak jacket is in the form of a fully flexible metal bellows (not shown).

Other features relevant to the general assembly of FIGURE 1 will now be described briefly as follows: Intervening between the core tank and the other tanks around it is a cylindrical mass of neutron shielding 43 comprising graphite blocks, this shielding being penetrated by a pocket 44 for use as an ion chamber and by another pocket 45 giving access to the coaxial ducting 20 for the purposes of a flow meter. The neutron shielding fits within a biological shield 46 of concrete which is formed with compartments accommodating the tanks around the core tank.

The tanks and shielding so far described are contained, together with further plant for the reactor, within a pressure-tight outer containment 46a which is of a spherical shape in this instance. Approximately at the horizontal diametral plane of this sphere, the concrete biological shielding provides a fuel charge and discharge face over which a refuelling machine 47 is movable on a track structure 48. To one side of the tank assembly, a vertical discharge chute 49 with valves at both ends extends through the concrete biological shielding and the outer containment to communicate with a subterranean fuel handling room 50. For the handling of major items of plant there is a gantry crane 51 installed within the outer containment above the charge and discharge face.

The interior of the outer containment is ventilated through ducting 52 and a cooling circulation of an inert gas, such as nitrogen, is maintained in the vault of the biological shielding, in which the tanks are situated, by a circulating system indicated at 53. Also within the outer containment and surrounding the biological shield is a buffer tank 54 which is in communication with the cover gas space above the liquid metal coolant in the tanks. Because of the added volume afforded by this tank, variation in the temperature of the liquid metal coolant, and hence its volume, does not cause undue change in the pressure of the cover gas. A cold trap for the precipitation and filtration of impurities in the liquid metal coolant is indicated at 55, there being pipework (not shown) for passing through this trap a fraction of the coolant delivery from the pumps 26.

In FIGURES 2b and 3 is seen an example of supporting structure for the several tanks. The basis of such structure is constituted by a number of columns 56 erected in the biological shielding vault between the neutron shielding 43 and the heat exchanger and pump tanks. On the one hand these columns have bearers 57 projecting inwardly through the neutron shielding towards the centre of the core tank, and on the other hand they have long arms 58 projecting parallel one to either side of each of the heat exchanger and pump tanks. Both the bearers and the arms present bearing surfaces in a horizontal plane substantially through the axes of the coaxial ducting 20, the bearing surfaces in the case of the arms being carried on a ring 59 which is interrupted at the location of the coaxial ducting. A similar ring 50 lies over but is inverted with respect to the ring 59 and the two rings engage through rolling elements such as 61 interposed between their respective bearing surfaces. In the same way as the core tank is supported directly on the bearers 57 through rockers in the form of upstanding thrust plates, such as 62, so the other tanks are supported on the respective rings 60 through upstanding thrust plates, such as 63. The support of these other tanks through rolling elements at the plane through the axes of the coaxial ducting enables accommodation of the movement arising at the ducts due to thermal expansion and contraction of the core tank, while the rockers accommodate the thermal expansion and contraction of the respective tanks.

A further detail apparent in these figures, and also FIGURE 2a, is the provision of thermal lagging indicated 64 around the heat exchanger and pump tanks.

The main modification in FIGURES 2a, 2b and 3 relative to FIGURE 1 is the inclusion of the pumps 26 with the heat exachngers. Thus the number of tanks, designated now 17a, around the core tank 10 is reduced to four. Within each tank 17a, the pump is situated centrally in the vacant middle space of an annular shell and tube heat exachnger 65, but is eccentric relative to the tank centre in a direction away from the core tank in order that the opening represented by the coaxial ducting 20 may be masked by a block of neutron shielding material 66. The shell of the heat exchanger 65 is a deep annular trough 67 having a division plate 68 terminating somewhat short of the bottom of the trough so that tube bundles, such as 69, may describe a path down one side of the division plate and up on the other side, each bundle having headers 70 and 71 at each end of this path. These headers are connected through ring pipes with connections, such as 72, penetrating the shield plug 19 for the circulation of the secondary coolant through the tubes of the bundles 69.

As modified, the inner duct 40 in every case is arranged to carry hot coolant leaving the core, and the outer end opens into a shallow trough 73 encircling the outline of the shielding block 66 and the trough 67 constituting the heat exchanger shell. At intervals around the perimeter of this shell there are openings establishing intercommunication between the two troughs so that the hot coolant will enter the heat exchanger; accordingly the width of the trough 73 diminishes towards the point remote from the coaxial ducting. Of the two limbs into which the shell of the heat exchanger is divided by the division plate 68 the inner has direct communication with the interior of the tank 17a through a series of openings (not shown) adjacent the top of the shell but beneath the operating level of liquid metal coolant in the tank 17a. Thus, the pumps 26 draw from the coolant reservoir common to the several tanks, as previously, but in this case the outlet pipe 31 delivers to a header box 74 from which a series of pipes 75, of the order of twenty, say, extend along a variety of paths permitting passage through the outer duct 39 of the coaxial ducting to the inlet plenum 34 beneath the core 11.

A further feature apparent in FIGURE 2a is a repository wtihin the core tank 10 for decaying fuel element assemblies, that is to say, assemblies which have been withdrawn from the core but which have to be cooled intensively to dissipate heat generated by the decay of accumulated radioactive fission products before they can be withdrawn outside the core tank. This repository is constituted by vertically spaced annular plates 76 and 77 suspended by a framework at a level above the core, these plates having aligned apertures in a similar manner to the plates 32 and 33 defining the inlet plenum so as to be capable of accepting the bottom stems of the fuel element assemblies. When positioned in this repository, a fuel element assembly stands upright outside the outline of the core.

For the building of the installation as previously described, it is anticipated that the construction and testing of the tanks should be completed in a site workshop, the material therefor being delivered in large pieces to keep welding in this workshop to a minimum, and that the completed tanks should then be lowered into position on to supports previously installed in the reactor vault. The interconnecting outer ducts would then be welded in situ. Advantageously these ducts permit a small degree of vertical deflection by being corrugated; for example a half inch deflection is obtainable with safe stressing if the ducts are 4 feet in diameter, 7 feet long and have 2 inch radius corrugations. In the case of the inner ducts welded joints are unnecessary and therefore the possibility of a similar amount of vertical deflection can be provided for in the joints.

What we claim is:

1. In a nuclear reactor of the kind having a core cooled by a liquid coolant, the combination comprising
   (a) a core tank vessel housing the core,
   (b) other separate tank vessels housing heat exchangers and coolant circulating means, each heat exchanger having an inlet to receive the coolant and an outlet to discharge the coolant directly to the interior of the respective vessel and each circulating means having an inlet open to the respective vessel interior and an outlet for delivery of coolant drawn from said interior,
   (c) thermally insulating means surrounding the core to define with internal surfaces of the core tank vessel a free space for coolant,
   (d) outer ducts establishing communication between said free space and the interior of each of said other tank vessels whereby a mass of liquid coolant constituting a coolant reservoir is common to all the vessels, and
   (e) ducting extending through the outer ducts to connect the outlets of the circulating means to an inlet to the core and to connect an outlet from the core to the heat exchanger inlets.

2. A nuclear reactor as claimed in claim 1 wherein each of said other tank vessels houses both a heat exchanger and a coolant circulating means, the ducting to the inlet of such heat exchanger comprising an inner duct concentric with the respective outer duct, and the ducting from the outlet of such circulating means comprising a series of pipes extending through space between the respective inner and outer ducts.

3. A nuclear reactor of the fast type having a core cooled by a liquid metal coolant and comprising a core tank vessel housing the core on a vertical axis, means defining beneath the core and inside the core tank vessel an inlet plenum for coolant to enter the core with upward flow, a top closure for the core tank vessel, thermal shielding around the core and extending thereabove to define with the walls of the core tank vessel a space intervening between these walls and coolant passing through and leaving the core, a plurality of other tank vessels, straight outer ducts with their axes in a common horizontal plane respectively establishing communication between the space defined in the core tank vessel and the interiors of each of said other tank vessels such that through these outer ducts a mass of coolant acting as a coolant reservoir is common to said space and the interiors of said other tank vessels, a top closure for each of said other tank vessels, a coolant circulating means depending into each of said other tank vessels from the respective top closure, an inlet for each circulating means by which coolant for circulation thereby is drawn from the interior of the respective tank vessel, a heat exchanger depending into each of said other tank vessels from the respective top closure and having shell structure describing a ring around the respective coolant circulating means, an inner duct penetrating the thermal shielding in the core tank vessel and extending coaxially within each of the outer ducts to each of the heat exchangers to conduct to the shell structure of the latter hot coolant leaving the core, an outlet for each heat exchanger shell structure by which coolant is discharged therefrom direct to the interior of the respective tank vessel, a header disposed within each of said other tank vessels to receive the delivery of the respective coolant circulating means, and an array of pipework for each header which follows a path through the respective outer duct and the space defined in the core tank vessel to conduct the delivery of the coolant circulating means from the header to the inlet plenum.

References Cited by the Examiner
UNITED STATES PATENTS

| | | | |
|---|---|---|---|
| 2,810,689 | 10/57 | Wigner et al. | 176—62 |
| 2,841,545 | 7/58 | Zinn | 176—18 |
| 3,000,728 | 9/61 | Long et al. | 176—61 |

CARL D. QUARFORTH, *Primary Examiner.*

REUBEN EPSTEIN, *Examiner.*